United States Patent
Tommy et al.

(10) Patent No.: US 10,552,599 B2
(45) Date of Patent: Feb. 4, 2020

(54) AUTHENTICATION SYSTEM AND METHOD

(71) Applicant: Tata Consultancy Services Limited, Mumbai (IN)

(72) Inventors: Robin Tommy, Trivandrum (IN); Ullas Ravi, Trivandrum (IN); Fathima Thasneem, Trivandrum (IN); Aswathy S. Krishna, Trivandrum (IN); Jobin P. Luke, Trivandrum (IN); Girija Subramanian, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 99 days.

(21) Appl. No.: 15/014,417

(22) Filed: Feb. 3, 2016

(65) Prior Publication Data

US 2017/0076083 A1 Mar. 16, 2017

(30) Foreign Application Priority Data

Sep. 10, 2015 (IN) .......................... 3482/MUM/2015

(51) Int. Cl.
*G06F 21/00* (2013.01)
*G06F 21/36* (2013.01)
*G06F 21/83* (2013.01)

(52) U.S. Cl.
CPC .............. *G06F 21/36* (2013.01); *G06F 21/83* (2013.01)

(58) Field of Classification Search
CPC ........... G06F 21/31; G06F 21/36; G06F 21/62
See application file for complete search history.

(56) References Cited

U.S. PATENT DOCUMENTS

| | | | | |
|---|---|---|---|---|
| 5,428,349 A | * | 6/1995 | Baker | G06Q 20/382 235/382.5 |
| 5,920,303 A | * | 7/1999 | Baker | G06F 3/0237 340/4.1 |

(Continued)

FOREIGN PATENT DOCUMENTS

CA    CA-2 574 983    7/2008

OTHER PUBLICATIONS

Florian Block et al., Touch-Display Keyboards: Transforming Keyboards into Interactive Surfaces, Apr. 10-15, 2010, ACM, pp. 1145-1154. (Year: 2010).*

(Continued)

*Primary Examiner* — Kari L Schmidt
*Assistant Examiner* — Fahimeh Mohammadi
(74) *Attorney, Agent, or Firm* — Finnegan, Henderson, Farabow, Garrett & Dunner LLP

(57) ABSTRACT

An authentication system and method is provided. The system: (a) provides a keyboard comprising a letters in a m×n format, 'm' represents rows, and n represents columns, each row or column includes a sub-set of the letters, (b) provides input receiving identifiers, each input receiving identifier specific to at least one row or column, (c) processes an input on at least one input receiving identifier from the set of input receiving identifiers, (d) identifies a first intended letter from a first sub-set of letters from a corresponding row or column based on the input, (e) repeats steps (c) and (d) until a last intended letter from a last sub-set of letters is identified to obtain intended identified letters, (f) performs a comparison between the intended identified letters with a pre-registered set of letters stored in a memory, and (g) triggers at least one action based on the comparison.

21 Claims, 11 Drawing Sheets

(56) References Cited

U.S. PATENT DOCUMENTS

| | | | | |
|---|---|---|---|---|
| 6,388,657 | B1* | 5/2002 | Natoli | G06F 3/014 |
| | | | | 345/156 |
| 6,895,514 | B1* | 5/2005 | Kermani | G06F 21/316 |
| | | | | 726/19 |
| 7,992,005 | B2 | 8/2011 | Torres et al. | |
| 8,036,433 | B1* | 10/2011 | Wolff | G06K 9/00174 |
| | | | | 382/119 |
| 8,863,260 | B2 | 10/2014 | Chougle et al. | |
| 8,863,280 | B1* | 10/2014 | Pennington | G06F 11/3672 |
| | | | | 713/187 |
| 2003/0182585 | A1* | 9/2003 | Murase | G06F 21/32 |
| | | | | 726/3 |
| 2005/0071637 | A1* | 3/2005 | Shirakawa | G06F 21/36 |
| | | | | 713/170 |
| 2005/0149762 | A1* | 7/2005 | Smith | G06F 21/31 |
| | | | | 726/19 |
| 2007/0101150 | A1* | 5/2007 | Oda | G06F 21/31 |
| | | | | 713/183 |
| 2009/0049555 | A1* | 2/2009 | Cho | G06F 21/31 |
| | | | | 726/26 |
| 2010/0031200 | A1* | 2/2010 | Chen | G06F 3/04883 |
| | | | | 715/863 |
| 2011/0004769 | A1* | 1/2011 | Won | G06F 21/36 |
| | | | | 713/183 |
| 2013/0009987 | A1* | 1/2013 | Takishita | G06F 1/1616 |
| | | | | 345/619 |
| 2013/0291096 | A1* | 10/2013 | Finnan | G06F 21/31 |
| | | | | 726/19 |
| 2014/0026210 | A1* | 1/2014 | Chung | H04W 12/06 |
| | | | | 726/17 |
| 2014/0115679 | A1* | 4/2014 | Barton | G09C 5/00 |
| | | | | 726/7 |
| 2014/0245433 | A1* | 8/2014 | Bao | G06F 21/31 |
| | | | | 726/19 |
| 2015/0006385 | A1* | 1/2015 | Shah | G06Q 20/40145 |
| | | | | 705/44 |
| 2015/0317469 | A1* | 11/2015 | Liu | G06F 21/36 |
| | | | | 726/19 |
| 2015/0350190 | A1* | 12/2015 | Li | H04L 9/3226 |
| | | | | 726/19 |

OTHER PUBLICATIONS

M Agarwal et al., Secure Authentication using Dynamic Virtual Keyboard Layout, Feb. 25-26, 2011, ACM, pp. 288-291. (Year: 2011).*

Jochen Rick, Performance Optimizations of Virtual Keyboards for Stroke-Based Text Entry on a Touch-Based Tabletop, Oct. 3-6, 2010, ACM, pp. 77-86. (Year: 2010).*

Hans Gellersen et al., Novel Interactions on the Keyboard, Mar. 19, 2012, IEEE, vol. 45, Issue: 4, pp. 36-40. (Year: 2012).*

CAMS Online Services. "Virtual Keyboard: Safe, Secure, Recommended II," located at <https://www.camsonline.com/COL_VirtualKeyBoard.htm> visited on Feb. 3, 2016. (1 page).

* cited by examiner

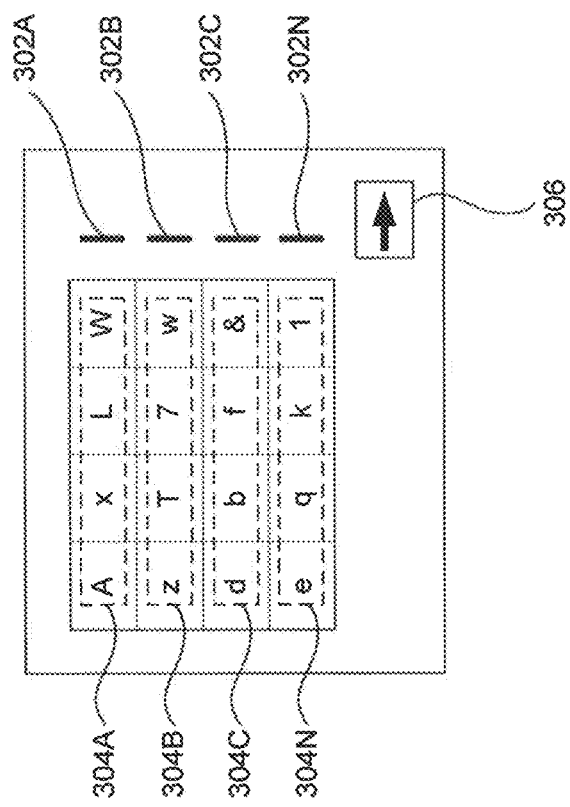
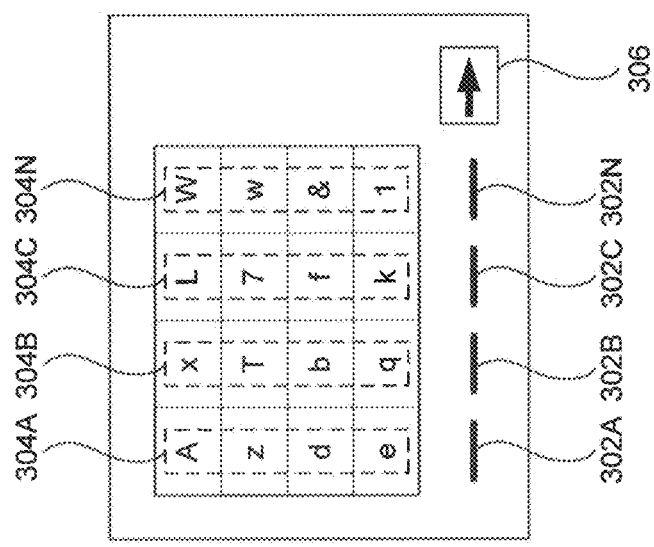
FIG. 3B
FIG. 3A

AUTHENTICATION SYSTEM AND METHOD

PRIORITY CLAIM

This U.S. patent application claims priority under 35 U.S.C. § 119 to: India Application No. 3482/MUM/2015, filed on Sep. 10, 2015. The entire contents of the aforementioned application are incorporated herein by reference.

TECHNICAL FIELD

This disclosure relates generally to authentication systems, and more particularly to authentication systems and methods for entry of letters or patterns and authenticating an authorized personnel based on the entry.

BACKGROUND

Security enhancements are generally provided by way of authentication of users. Such authentication requires users to login by entering credentials such as username and/or a password for authorization of access to a computing system, and the like. Passwords are required to be chosen carefully so that it is hard for anybody to hack or crack the same. In order to prevent unauthorized access effectively, a password should preferably be a complex combination of alphanumeric characters. However, challenges remain in inputting the characters using keyboards. Keyboard logging or keystroke logging is a process of recording key entries of legitimate users without their knowledge.

In conventional systems, empty fields are provided where users are required to provide login name and password. User inputs are provisioned by the most commonly recognized keyboard from its inception to this day which is the QWERTY keyboard and/or a numerical keypad. With the advancement of technology, users are now able to use a virtual keyboard (also referred to as an onscreen keyboard). However, users continue to enter credentials in a conventional manner to log into a system. Such conventional keyboard systems risk leaking of passwords, thereby causing high security concerns.

During the process of entering the credentials, generally there are a lot of interceptions from unauthorized users which may result in shoulder surfing. Shoulder surfing is a practice, where an observer simply watches (or spies) the keyboard entries to learn the credentials entered by an authentic (or authorized) user. Potential risk of shoulder surfing is elevated when conventional keyboards are used. There are several approaches taken to improve keyboards, but these approaches are not foolproof, further remain ineffective, and to a large extent are unsuccessful in providing an effective input interface keyboard with enhanced security for presenting and inputting of data.

SUMMARY

Embodiments of the present disclosure present technological improvements as solutions to one or more of the above-mentioned technical problems recognized by the inventors in conventional systems. For example, in one embodiment, a processor implemented method is provided. The method comprising: (a) providing a keyboard comprising a set of letters in a m×n format, wherein 'm' represents a number of rows, and n represents a number of columns, wherein each row or column comprises a sub-set of the letters, (b) providing a set of input receiving identifiers, each input receiving identifier specific to at least one row or at least one column in the m×n format, (c) processing an input on at least one input receiving identifier from the set of input receiving identifiers, (d) identifying a first intended letter from a first sub-set of letters from at least one corresponding row or column based on the input received on the at least one input receiving identifier, (e) repeating the steps (c) and (d) until a last intended letter from a last sub-set of letters in said set of letters is identified to obtain a set of intended identified letters, (f) performing a comparison between the set of intended identified letters with a pre-registered set of letters stored in a memory, and (g) triggering at least one action based on the comparison. In an embodiment, the triggering of the at least one action based on the comparison comprises authenticating a user when each letter in the set of intended identified letters matches a corresponding letter in the pre-registered set of letters in a sequential manner (or matching is performed in a particular order of the pre-registered letters and the set of intended identified letters).

In an embodiment, identifying the first intended letter from the first sub-set of letters comprises one or more of (h) identifying at least one row or a column from the number of rows and the number of columns based on the input received on the input receiving identifier, (i) determining whether the first intended letter is present in the first sub-set of letters, (j) comparing a property of each letter from the first sub-set of letters with a corresponding letter in the pre-registered letters, wherein the property comprises at least one of a letter style, a letter size and a dimension, and (k) identifying a letter as the first intended letter from the first sub-set of letters from at least one corresponding row or column when the letter matches a corresponding letter from the pre-registered letters. In an embodiment, the method further comprises (l) shuffling the set of letters in the m×n format each time an intended letter is identified. In an embodiment, the set of letters are selected from one or more languages. Alternatively, the set of letters can comprise at least one of a character, a numeric, and a symbol, wherein the character is at least one of an upper case or a lower case.

In an embodiment, the processor implemented method described herein above further comprises (m) providing a pattern on a display unit, the pattern comprising one or more pattern identifiers, (n) processing an input on a corresponding pattern identifier from the one or more pattern identifiers, (o) identifying an intended pattern identifier from the one or more pattern identifiers in the pattern based on the input, (p) repeating the steps (n) and (o) until a last intended pattern identifier from the one or more pattern identifiers is identified to obtain an intended path taken to complete the pattern, (q) performing another comparison of the set of intended identified letters and the intended path taken to complete the pattern with the pre-registered set of letters and the pattern on the display unit in a sequential manner (or the user is authenticated based the matching in a particular order of the pre-registered letters and the set of intended identified letters), and (r) triggering at least one another action based on the another comparison. In an embodiment, the at least one another action comprises authenticating a user when (i) each letter in the set of intended identified letters matches a corresponding letter in the pre-registered set of letters stored in the memory (or the user is authenticated based the matching in a particular order of the pre-registered letters and the set of intended identified letters), and (ii) the path matches the pattern in a sequential manner.

In another embodiment, a processor implemented system is provided. The processor implemented system comprises a memory storing instructions, and a hardware processor coupled to the memory, wherein the hardware processor is configured by the instructions to (a) provide a keyboard comprising a set of letters in a m×n format, wherein 'm' represents a number of rows, and n represents a number of columns, wherein each row or column comprises a sub-set of the letters, (b) provide a set of input receiving identifiers, each input receiving identifier specific to at least one row or at least one column in the m×n format, (c) process an input on at least one input receiving identifier from the set of input receiving identifiers, (d) identify a first intended letter from a first sub-set of letters from at least one corresponding row or column based on the input received on the at least one input receiving identifier, (e) repeat the steps (c) and (d) until a last intended letter from a last sub-set of letters is identified to obtain a set of intended identified letters, (f) perform a comparison between the set of intended identified letters with a pre-registered set of letters stored in a memory in a sequential manner (or comparison is performed in a particular sequential order of the pre-registered letters and the set of intended identified letters), and (g) trigger at least one action based on the comparison. The at least one action comprises authenticating a user when each letter in the set of intended identified letters matches a corresponding letter in the pre-registered set of letters in a sequential manner (or matching is performed in a particular order of the pre-registered letters and the set of intended identified letters).

In an embodiment, the first intended letter is identified from the first sub-set of letters when the hardware processor is configured to perform one or more of (h) identify at least one row or a column from the number of rows and the number of columns based on the input received on the input receiving identifier, (i) determine whether the first intended letter is present in the first sub-set of letters, (j) compare a property of each letter from the first sub-set of letters with a corresponding letter in the pre-registered letters, wherein the property comprises at least one of a letter style, a letter size and a dimension, and (k) identify a letter as the first intended letter from the first sub-set of letters from at least one corresponding row or column when the letter matches a corresponding letter from the pre-registered letters. The hardware processor is further configured by the instructions to (l) shuffle the set of letters in the m×n format each time an intended letter is identified. In an embodiment, the set of letters are selected from one or more languages, wherein the set of letters can comprise at least one of a character, a numeric, and a symbol; and the character is at least one of an upper case, or a lower case.

In an embodiment, the hardware processor is further configured by the instructions to (m) provide a pattern on a display unit, the pattern comprising one or more pattern identifiers, (n) process an input on a corresponding pattern identifier from the one or more pattern identifiers, (o) identify an intended pattern identifier from the one or more pattern identifiers in the pattern based on the input, (p) repeat the steps (n) and (o) until a last intended pattern identifier from the one or more pattern identifiers is identified to obtain an intended path taken to complete the pattern, (q) perform another comparison of the set of intended identified letters and the intended path taken to complete the pattern with the pre-registered set of letters and the pattern on the display unit, and (r) trigger at least one another action based on the another comparison. In an embodiment, the at least one another action comprises authenticating a user when (i) each letter in the set of intended identified letters matches a corresponding letter in the pre-registered set of letters stored in the memory, and (ii) the path matches the pattern in a sequential manner (or the user is authenticated based the matching in a particular order of (i) the pre-registered letters and the set of intended identified letters, and (ii) the intended path and the pattern displayed on the display unit).

In yet another embodiment, one or more non-transitory machine readable information storage mediums comprising one or more instructions is provided. The one or more instructions which when executed by one or more hardware processors causes (a) providing a keyboard comprising a set of letters in a m×n format, wherein 'm' represents a number of rows, and n represents a number of columns, wherein each row or column comprises a sub-set of the letters, (b) providing a set of input receiving identifiers, each input receiving identifier specific to at least one row or at least one column in the m×n format, (c) processing an input on at least one input receiving identifier from the set of input receiving identifiers, (d) identifying a first intended letter from a first sub-set of letters from at least one corresponding row or column based on the input received on the at least one input receiving identifier, (e) repeating the steps (c) and (d) until a last intended letter from a last sub-set of letters is identified to obtain a set of intended identified letters, (f) performing a comparison between the set of intended identified letters with a pre-registered set of letters stored in a memory, and (g) triggering at least one action based on the comparison. The triggering the at least one action based on the comparison comprises authenticating a user when each letter in the set of intended identified letters matches a corresponding letter in the pre-registered set of letters.

Identifying the first intended letter from the first sub-set of letters comprises (h) identifying at least one row or a column from the number of rows and the number of columns based on the input received on the input receiving identifier, (i) determining whether the first intended letter is present in the first sub-set of letters, (j) comparing a property of each letter from the first sub-set of letters with a corresponding letter in the pre-registered letters, wherein the property comprises at least one of a letter style, a letter size and a dimension, and (k) identifying a letter as the first intended letter from the first sub-set of letters from at least one corresponding row or column when the letter matches a corresponding letter from the pre-registered letters. The one or more instructions further causes the hardware processors to perform (l) shuffling the set of letters in the m×n format each time an intended letter is identified. The set of letters are selected from one or more languages. The set of letters comprises at least one of a character, a numeric, and a symbol. The character is at least one of an upper case, or a lower case.

The one or more instructions further causes the hardware processors to perform (m) providing a pattern on a display unit, the pattern comprising one or more pattern identifiers, (n) processing an input on a corresponding pattern identifier from the one or more pattern identifiers, (o) identifying an intended pattern identifier from the one or more pattern identifiers in the pattern based on the input, (p) repeating the steps (n) and (o) until a last intended pattern identifier from the one or more pattern identifiers is identified to obtain an intended path taken to complete the pattern, (q) performing another comparison of the set of intended identified letters and the intended path taken to complete the pattern with the pre-registered set of letters and the pattern on the display unit, and (r) triggering at least one another action based on the another comparison. The at least one another action comprises authenticating a user when (i) each letter in the set of intended identified letters matches a corresponding letter in the pre-registered set of letters stored in the memory, and (ii) the path matches the pattern.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A-3B illustrates a user interface view of a virtual keyboard comprising an exemplary set of letters arranged in a m×n format and displayed on a display unit by the authentication system of FIG. 1 according to an embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
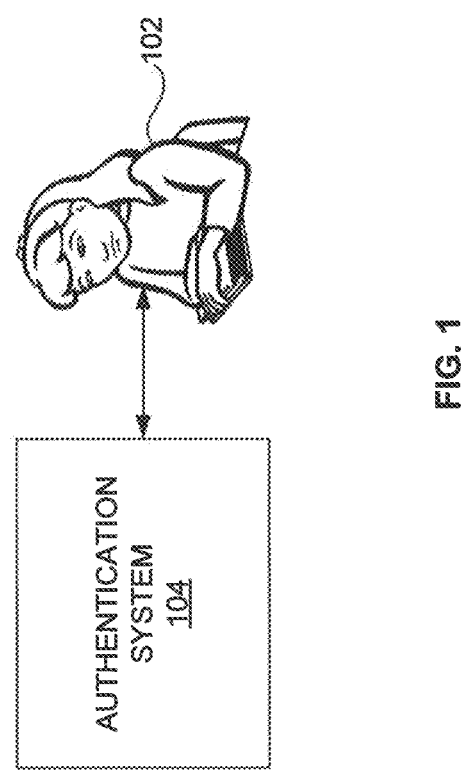
FIG. 1 illustrates a user interacting with an authentication system according to an embodiment of the present disclosure.

FIG. 1 illustrates a user 102 interacting with an authentication system 104 according to an embodiment of the present disclosure. The authentication system 104 provides a keyboard that enables the user 102 to input one or more credentials in an effective manner. The authentication system 104 is configured to provide a user interface with a multidimensional and multilingual keyboard (e.g., a virtual keyboard, or a hardware keyboard). The keyboard comprises, but is not limited to, letters, patterns (or captcha) in one or more different languages. The authentication system 104 provides this keyboard to the user 102 in one or more m×n format (e.g., a m×n matrix format, where 'm' and 'n' range from 1, 2, 3, and so on), thus providing the user 102 a choice to select a username and/or a password in more than one language and pattern. Further, the authentication system 104 is configured to receive user input in the form of intended letters, patterns, or combinations thereof in one or more languages, and authenticate the user 102 based on a comparison between the set of intended letters identified and a pre-registered set of letters (e.g., a username or a password). The pre-registered set of letters comprises at least one of a character, a numeral, and a symbol in one or more languages, and in one or more format (e.g., an upper case, or a lower case). The one or more languages, comprise, but are not limited to, United States English, United Kingdom (UK) English, or Indian regional languages, for example, Kannada, Hindi, Marathi, Bengali, Oriya, Tamil, Telugu, Malayalam, and so on.

Figure 2:
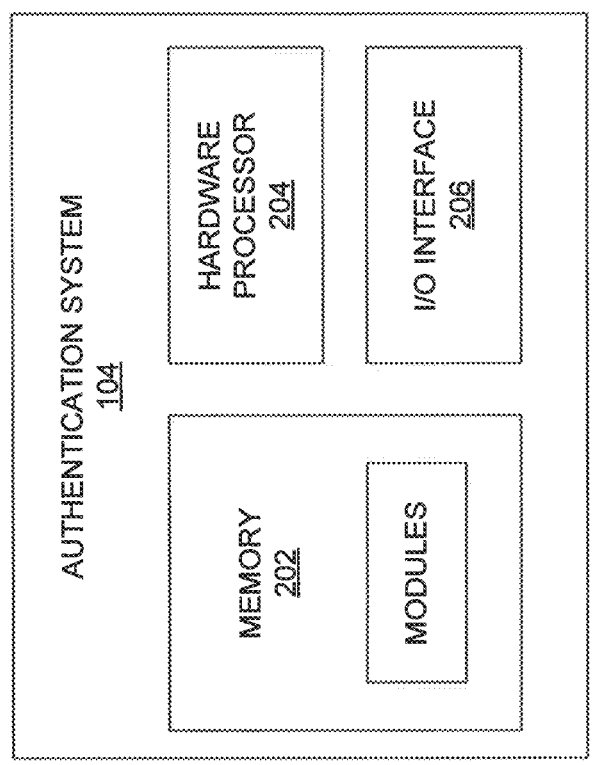
FIG. 2 illustrates a block diagram of the authentication system of FIG. 1 according to an embodiment of the present disclosure.

FIG. 2, with reference to FIG. 1 illustrates a block diagram of the authentication system 104 according to an embodiment of the present disclosure. The authentication system 104 comprises a memory 202, a hardware processor 204, and an input/output (I/O) interface 206. The memory 202 further includes one or more modules. The memory 202, the hardware processor 204, the input/output (I/O) interface 206, and/or the modules may be coupled by a system bus or a similar mechanism.

The memory 202, may store instructions, any number of pieces of information, and data, used by a computer system, for example the authentication system 102 to implement the functions of the authentication system 104. The memory 202 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 202 may be configured to store information, data, applications, instructions or the like for enabling the authentication system 104 to carry out various functions in accordance with various example embodiments.

Additionally or alternatively, the memory 202 may be configured to store instructions which when executed by the hardware processor 204 causes the authentication system to behave in a manner as described in various embodiments (e.g., identifying select customers/one or more users from a group of users for adjusting a credit limit to another credit limit for a succeeding month based on the information). The memory 202 stores information for example, Information comprising at least one of letters, patterns (or captchas), and the pre-registered set of letters (or pre-registered password) and so on. The letters comprises at least one of a character, a numeral, a symbol, or a whitespace/blank space. The character is at least one of an upper case, or a lower case.

The hardware processor 204 may be implemented as one or more microprocessors, microcomputers, microcontrollers, digital signal processors, central processing units, state machines, logic circuitries, and/or any devices that manipulate signals based on operational instructions. Further, the hardware processor 204 may comprise a multi-core architecture. Among other capabilities, the hardware processor 204 is configured to fetch and execute computer-readable instructions or modules stored in the memory 202. The hardware processor 204 may include circuitry implementing, among others, audio and logic functions associated with the communication. For example, the hardware processor 204 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 204 thus may also include the functionality to encode messages and/or data or information. The hardware processor 204 may include, among other things, a clock, an arithmetic logic unit (ALU) and logic gates configured to support operation of the hardware processor 204. Further, the hardware processor 204 may include functionality to execute one or more software programs, which may be stored in the memory 202 or otherwise accessible to the hardware processor 204.

The hardware processor 204 is configured by the instructions stored in the memory 202. The hardware processor 204 when configured by the instructions provides a keyboard (e.g., a virtual keyboard, or a convention hardware keyboard modified such that the keyboard comprises a set of letters in m×n format, 'm' represents a number of rows, and 'n' represents a number of columns, wherein each row or column comprises a sub-set of the letters. For example, a first row comprises a first set of letters, a second row comprises a second set of letters, a third row comprises a third set of letters, and a fourth row comprises a fourth set of letters, thus forming a 4×4 matrix. The (virtual) keyboard may be provided on a display unit (not shown in FIG. 2). The display unit may be integrated within the authentication system 104, or externally connected to the authentication system 104. In case of the hardware keyboard, it may be connected to a system to receive inputs from the hardware keyboard. Similarly, the hardware processor 204 provides a set of input receiving identifiers on a display unit. In case of a hardware keyboard, the keyboard may present the set of letters in the above m×n format, and a set of input receiving identifiers (e.g., a corresponding input button, or a corresponding hardware component). These buttons or hardware components are aligned or in parallel to the letters in the m×n format. Each input receiving identifier is specific to at least one row or a column in the m×n format. For example, a first input receiving identifier is provided that is specific to the first row of a matrix comprising m×n format. Similarly, a second input receiving identifier is provided that is specific to the second row of the same matrix, and so on. Alternatively, the same first input receiving identifier may be provided specific to a first column of the matrix comprising m×n format. Similarly, the second input receiving identifier may be provided specific to a second column of the same matrix, and so on.

The number of input receiving identifiers provided on the display unit varies and is based on the type of m×n matrix format displayed on the display unit. Similarly, the position of the input receiving identifiers is based on the type of m×n matrix displayed on the display unit. As described above, for example, for a 4×4 matrix, 4 input receiving identifiers are provided. These 4 input receiving identifiers may be positioned either vertically or horizontal with respect to the 4×4 matrix, such that they are aligned in parallel to the letters in each of the 4 rows or 4 columns. The input receiving identifiers may be represented by empty slots/fields (or denoted by a symbol) for example, a circle, a square, -, _, or any representative symbol (or the like) that enables the user 102 to provide one or more inputs on a respective input receiving identifier.

Upon providing the input receiving identifiers on the display unit, one or more inputs may be processed. The one or more inputs may comprise an enter keystroke from keyboard, an input click on, or a selection of, a specific input receiving identifier from the set of input receiving identifiers. The one or more inputs may further comprise a mouse hover for selection of a particular input receiving identifier. When an input is received on at least one input receiving identifier, a specific row or a specific column is identified based on the position of the selected input receiving identifier. For example, when an input on a first input receiving identifier is received, a corresponding row or column (e.g., a first row or a first column) is identified based on the position of the first input receiving identifier. This identified row or column comprises a sub-set of letters as described above. For example, when the first row is identified, the first row comprises a first of sub-set of letters. The authentication system 104 identifies a first intended letter from the first sub-set of letters from the first identified row based on the input received on the first input receiving identifier. This identification involves determination of whether the first intended letter is present in the first sub-set of letters. For example, the first intended letter is obtained (or determined) by comparing a property of each letter from the first sub-set of letters with a corresponding letter in the pre-registered letters. For example, a letter style such as bold, italics, underline, colored, and so on, a letter size such as large, medium, or small, and a dimension of each letter from the first sub-set of letters is compared with a letter style, a letter size and a dimension of a first letter in the pre-registered letters (e.g., the pre-registered password).

When the property of at least one letter from the first sub-set of letters matches with a property of the first letter in the pre-registered password, then that letter is identified as the first intended letter of the password. The above steps of receiving an input on input receiving identifiers, identifying corresponding row or column, and identifying intended letters are repeated until a last intended letter from the set of letters is identified to obtain a set of identified intended letters. The hardware processor 204 further performs a comparison between the set of intended identified letters with the pre-registered set of letters (e.g., the pre-registered password) stored in the memory 202, and triggers at least one action based on the comparison. The at least one action comprises authenticating the user 102 when each letter in the set of intended identified letters matches a corresponding letter in the pre-registered set of letters (e.g., the pre-registered password). The authentication system 104 may shuffle the set of letters in the m×n format each time an intended letter is identified, and further display the set of letters in more than one language, thus making it difficult for a shoulder surfer to observe what letters are selected and identified from which language for authenticating the user 102 (or any authorized personnel), thereby resulting in enhanced security. The shuffling of letters may be performed in one or more form, a circular shuffling, a diagonal shuffling, and so on.

The above described steps may further be implemented by the authentication system 104 for identifying an intended pattern. For example, when the pre-registered password comprises a numeric (e.g., 4), in addition to alphabets (and/or symbols), the authentication system 104 may display a pattern on the display unit. The pattern comprises one or more pattern identifiers. In this case, the pattern is specific to the numeric 4. For instance, the numeric 4 may be displayed by way of a pattern to be completed using a set of pattern identifiers. The hardware processor 204 processes an input on a corresponding pattern identifier from the one or more pattern identifiers to identify an intended pattern identifier from a set of displayed pattern identifiers in the pattern. The steps of processing the input, and identifying an intended pattern identifier may be repeated until a last intended pattern identifier from the one or more pattern identifiers is identified to obtain an intended path taken to complete the pattern (e.g., numeric 4 presented as a pattern). The hardware processor 204 then performs another comparison of the set of intended identified letters and the intended path taken to complete the pattern with the pre-registered set of letters (e.g., the pre-registered password) and the pattern displayed on the display unit, and further trigger another action based on this comparison. This another action in this case comprises authenticating the user 102 when at least one of (i) each letter in the set of intended identified letters matches a corresponding letter in the pre-registered set of letters stored in the memory 202, and (ii) the path matches the pattern displayed on the display unit.

Alternatively, the authentication system 104 may execute the modules comprising an input processing module that when executed by the hardware processor 204 processes inputs on the inputs receiving identifiers for obtaining the set of identified intended letters. The set of intended letters are identified using an intended letters identification module. For example, a first intended letter is identified by the intended letters identification module, when the intended letters identification module identifies at least one row or a column from the m×n matrix format, based on an input received on at least one input receiving identifier, determines whether the first intended letter is present in a first sub-set of letters. The intended letters identification module further performs comparison of a property of each letter from the first sub-set of letters with a corresponding letter in the pre-registered letters, and then identifies a letter as the first intended letter from the first sub-set of letters when the property of that letter matches the property of a corresponding first letter from the pre-registered letters. The authentication system 104 further comprises a comparison module that when executed by the hardware processor 204 performs a comparison between the set of identified intended letters with a pre-registered set of letters (e.g., the pre-registered password).

Similarly, the authentication system 104 comprises a shuffling module that when executed by the hardware processor 204 shuffles (in one or more languages) the set of letters in the m×n format, each time an intended letter is identified. Further, the authentication system 104 comprises a pattern identification module that when executed by the hardware processor 204 identifies a path taken by the user 102 to complete a pattern displayed on the display unit. The comparison module may further perform a comparison of the set of intended identified letters and the intended path taken to complete the pattern with the pre-registered set of letters and the pattern on the display unit.

The authentication system 104 further comprises a triggering module that when executed by the hardware processor 204 triggers one or more actions, for example, authenticating a user based on the comparison. In an example embodiment, the user 102 is authenticated (e.g., using an authenticating module) when the set of intended identified letters matches with the pre-registered set of letters. Alternatively, the user 102 is authenticated (using the authenticating module) when the set of intended identified letters and the intended path taken to complete the pattern match with the pre-registered set of letters and the pattern on the display unit.

The input processing module, the intended letters identification module identifies, the comparison module, the shuffling module, the pattern identification module, the triggering module, the authentication module are implemented as at least one of a logically self-contained part of a software program, a self-contained hardware component, and/or, a self-contained hardware component, with a logically self-contained part of a software program embedded into each of the hardware component that when executed perform the above method described herein, in one embodiment.

Further, the authentication system 104 may be implemented with the above described steps involving pre-determined time interval. In other words, one or more inputs can be received on corresponding input receiving identifiers within a specified time interval. For example, a first input may be received on a first input receiving identifier within a first time interval (e.g., 30 seconds). Similar approach may be implemented by the authentication system 104 to complete the process of receiving inputs for identifying remaining intended letters (or intended pattern identifiers) with a specific time interval. Furthermore, each time when the user 102 attempts to provide credentials, the time interval for entering inputs may vary. Moreover, when an incorrect input is received on an input receiving identifier (or on a pattern identifier), a notification message may be displayed for example, "input incorrect", and then the user 102 may be prompted to provide a correct input within a specified time interval. For example, the 102 user will be provided with an alert message when he/she makes an error while entering the initial characters of the password. The alert message may be displayed based on various attributes. These attributes are predicted by the authentication system 104, where the attributes may comprises, for example, but are not limited to, previous history of the user 102 in keying the password characters, learning the errors/mistakes which includes learning the pattern in which the user 102 is making a mistake in password entry. Other attributes include an age, gender and geography based learning of the user 102 in the password entry, provided such a profile of the user 102 is pre-stored in the memory 202.

FIG. 3A-3B, with reference to FIG. 1, illustrate a user interface view of a virtual keyboard comprising an exemplary set of letters arranged in a m×n format and displayed on a display unit by the authentication system 104 according to an embodiment of the present disclosure. More particularly, FIG. 3A illustrates the virtual keyboard with a set of input receiving identifiers, where the set of input receiving identifiers are positioned horizontally and aligned with the m×n matrix, where both m is '4' and n is '4', for example. As depicted in FIG. 3A, the virtual keyboard comprises a first input receiving identifier 302A, a second input receiving identifier 302B, a third input receiving identifier 302C, and a fourth input receiving identifier 302N (collectively known as a set of input receiving identifiers 302). Each of the input receiving identifiers are specific to a row or a column in the m×n matrix. For instance, the first input receiving identifier 302A is specific to a first column 304A that comprises a first sub-set of letters for example, A, z, d, and e.

Similarly, the second input receiving identifier 302B is specific to a second column 304B that comprises a second sub-set of letters for example, x, T, b, and q. Further, the third input receiving identifier 302C is specific to a third column 304C that comprises a third sub-set of letters, for example, L, 7, f, and k. Likewise, the fourth input receiving identifier 302N is specific to a fourth column 304N that comprises a fourth sub-set of letters, for example, W, w, &, and 1

FIG. 3B illustrates the virtual keyboard with the set of input receiving identifiers, where the set of input receiving identifiers are positioned vertically and aligned with the m×n matrix. The virtual keyboard as depicted in FIG. 3A-3B comprises a navigation button 306 (e.g., an arrow symbol), that enables the user 102 to navigate to at least one of from English letters with small letters, pattern keyboard, or to any other language, etc. Repeating an input on the navigation button may revert the user interface to a default view. Alternatively, the virtual keyboard may comprise a back arrow button, that when receives an input, enables the authentication system 104 to display a previous (or last view). As described above in FIG. 3A, the mapping of input receiving identifiers is done for respective rows or columns.

Although, the embodiments described in the present disclosure provide a virtual keyboard (or a laser keyboard, touch keyboard, and so on), the authentication system 104 can also be implemented for any software/hardware keyboards (e.g., Bluetooth keyboard, wireless keyboard, or any Near Field Communication (NFC) keyboard, and so on) and/or hardware keyboards (e.g., such as modifying the conventional QWERTY or any similar hardware keyboard,). For example, in a first computing device (e.g., a computer system), when the user 102 is providing credentials for authenticating to access information, in such cases, a second computing device (e.g., a smart watch) can be paired to the first computing device (e.g., using a wireless or NFC technique), where the second computing device (e.g., the smart watch) can display the keyboard to the user 102. The user 102 may provide credentials using the keyboard presented on the second computing device (e.g., the smart watch) without having to enter any letters on an actual input interface (e.g., a keyboard) of the first computing device, thereby providing an enhanced security. Further, the conventional hardware and virtual keyboards may be modified such that the conventional keyboard comprises a set of letters arranged in m×n matrix format, and a set of corresponding input receiving identifiers, and pattern receiving identifiers, where each input receiving identifier is specific to a row or a column.

Figure 4A:
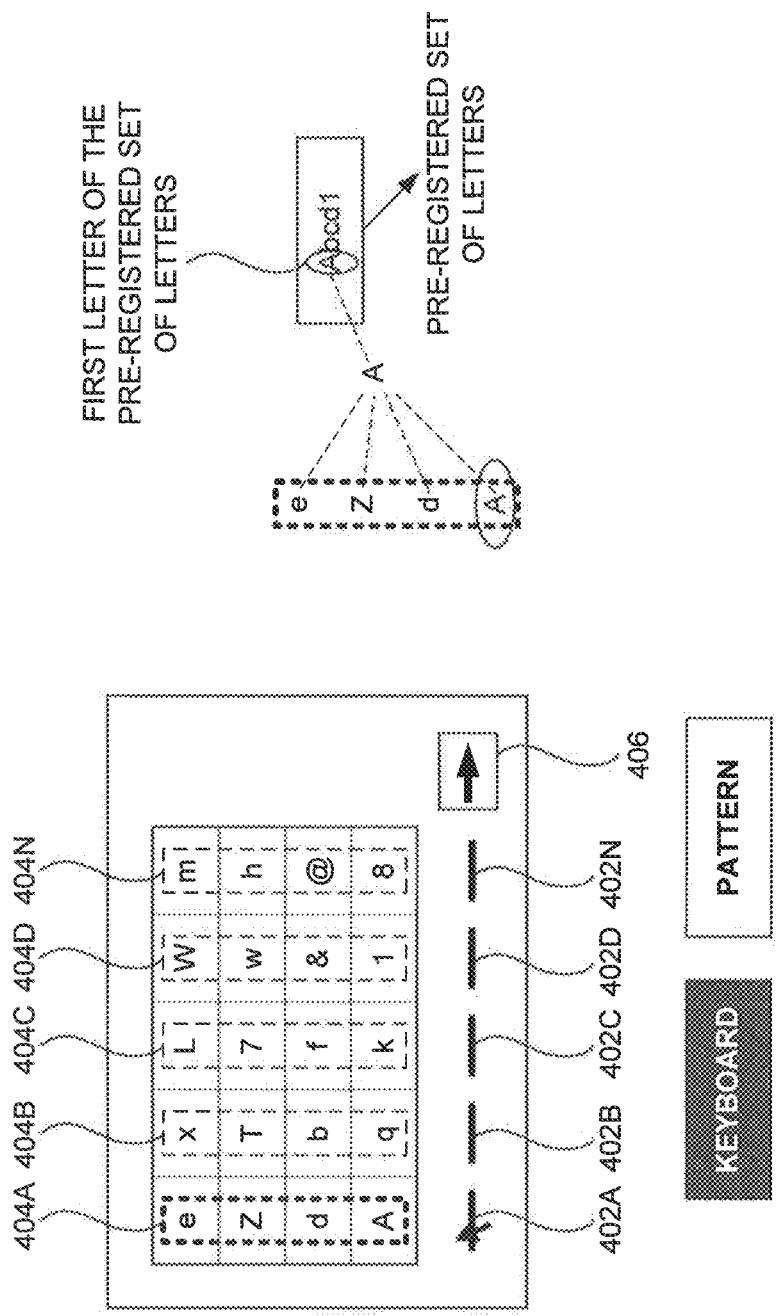
FIG. 4A-4E illustrate an exemplary view of entering letters and/or patterns into a field for authenticating the user of FIG. 1 using the authentication system of FIG. 1 according to an embodiment of the present disclosure.

FIG. 4A-4E, with reference to FIGS. 1 through 3B, illustrate exemplary views of entering letters and/or patterns into a field for authenticating the user 102 using the authentication system 104 according to an embodiment of the present disclosure. Assuming the pre-registered set of letters (or password) is Abcd1, and a set of letters in a 5×4 matrix format is provided on the display unit. One or more inputs are received, and intended letters are identified and compared with the pre-registered letter for triggering an action. The virtual keyboard is displayed on the display unit as depicted in FIG. 4A. When the authentication system 104 receives a first input on an input receiving identifier (e.g., on a first input receiving identifier 402A), a column (e.g., a first column 404A is identified specific to the first input receiving identifier 402A. In this scenario, the letter A is present in the first column, the user 102 may provide an input on the first input receiving identifier. When the input is received on the first input receiving identifier 402A, that column (e.g., the first column 404A) is identified by the authentication system 104. The authentication system 104 identifies the first sub-set of letters and performs comparison of the first sub-set of letters with the first letter of the pre-registered password Abcd1 as depicted in FIG. 4A. For example, the property of each letter from the first sub-set of letters is compared with the property of a first letter 'A' in the password. In this case, the first sub-set of letters are e, Z, d, and A, which are compared (or mapped to identify an actual intended letter 'A') with the first letter A in the actual password. The property (e.g., font style, size, and/or dimension) of A from the first sub-set of letter matches the property (e.g., font style, size, and/or dimension) of first letter A in the password. The authentication system 104 then identifies the first intended letter as A based on the property match, as the property of remaining letters (e.g., e, Z, and d) does not match the property of the first letter 'A' in the actual password.

Figure 4B:
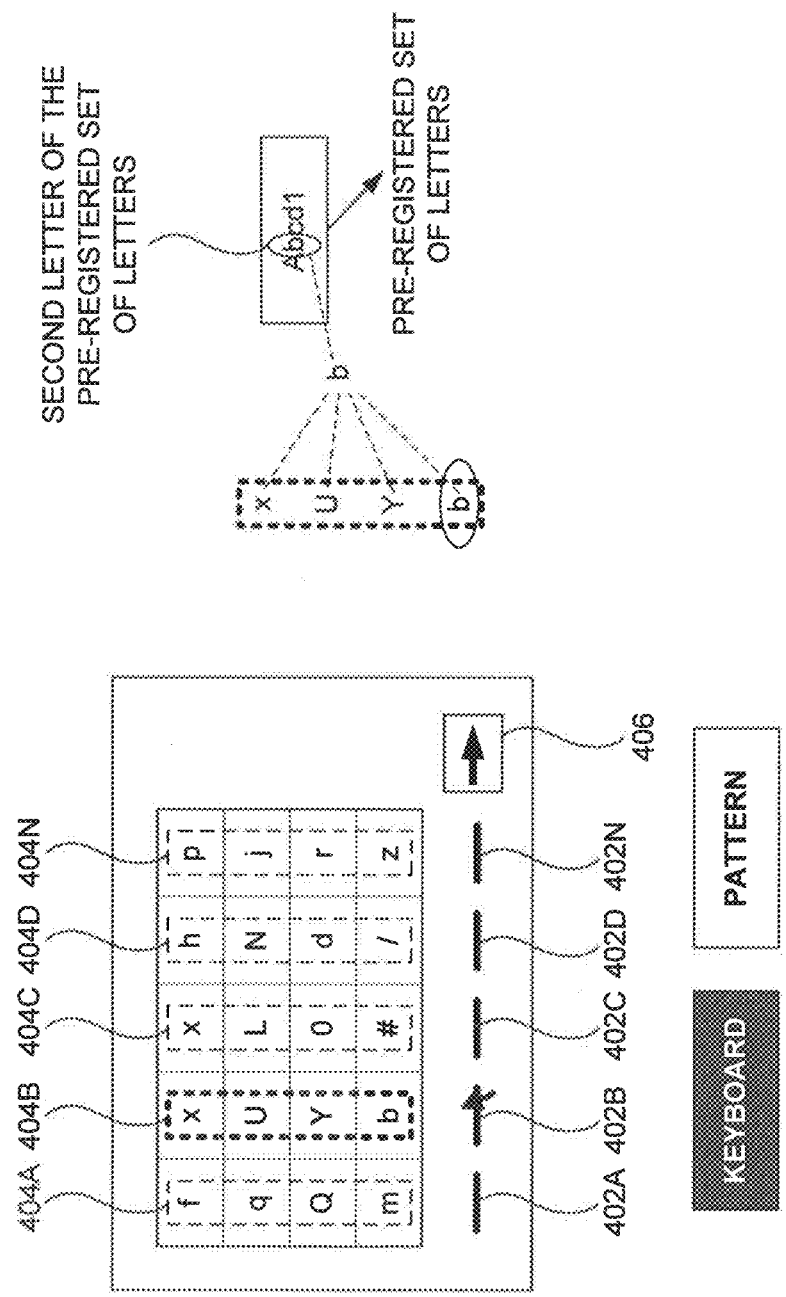

Although FIG. 4A depicts the intended letter identification for one letter, a similar technique is implemented to follow and identify remaining intended letters/numerals of the password as depicted in FIG. 4B-4E. For instance, when an input is received on the second input receiving identifier 402B, that column (e.g., the second column 404B) is identified by the authentication system 104. The authentication system 104 identifies a second sub-set of letters and performs comparison of the second sub-set of letters with a second letter of the pre-registered password Abcd1 as depicted in FIG. 4B. For example, the property of each letter from the second sub-set of letters is compared with the property of the second letter 'b' in the password. In this case, the second sub-set of letters are x, U, Y, and b, which are compared (or mapped to identify an actual intended letter 'b') with the second letter 'b' in the actual password as depicted in FIG. 4B. The property (e.g., font style, size, and/or dimension) of 'b' from the second sub-set of letter matches the property (e.g., font style, size, and/or dimension) of first letter 'b' in the password. The authentication system 104 then identifies the second intended letter as 'b' based on the property match, as the property of remaining letters (e.g., x, U, and Y) does not match the property of the second letter 'b' in the actual password.

Figure 4C:
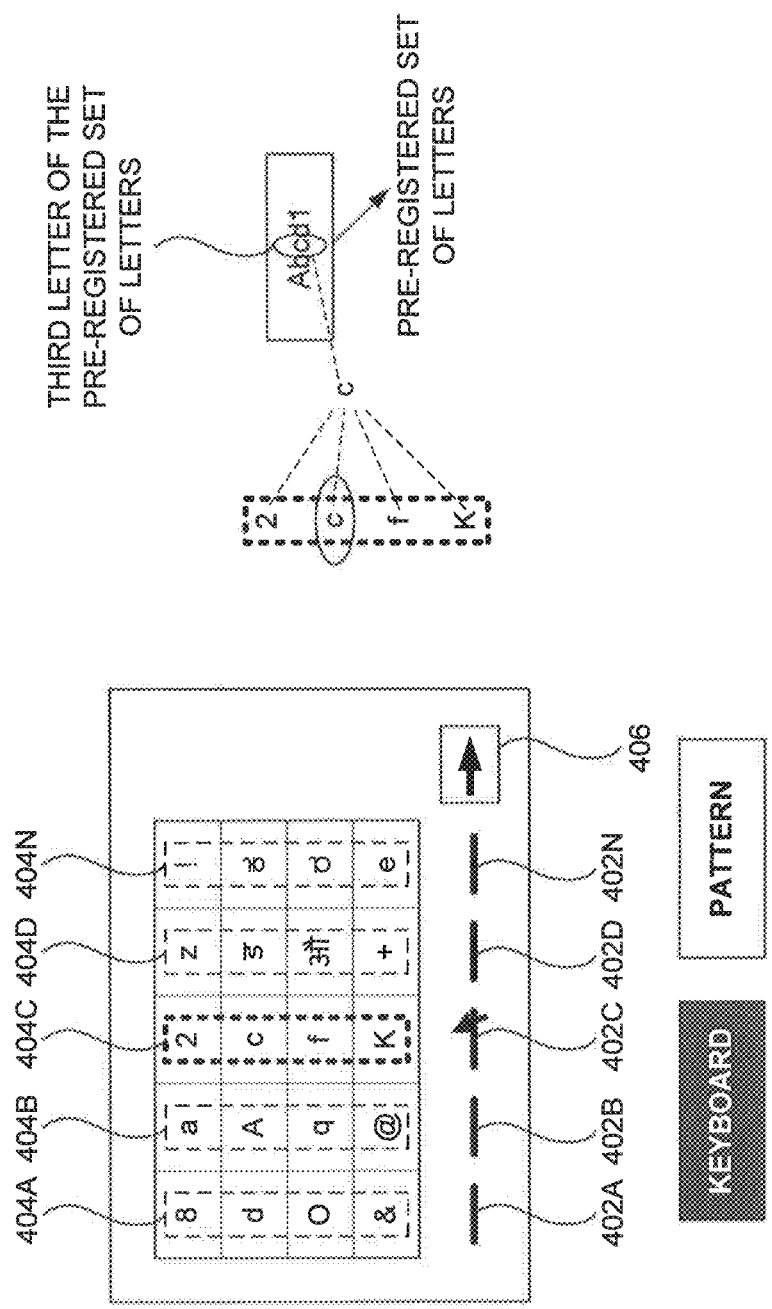

Similarly, when an input is received on the third input receiving identifier 402C, that column (e.g., the third column 404C) is identified by the authentication system 104. The authentication system 104 identifies a third sub-set of letters and performs comparison of the third sub-set of letters with a third letter of the pre-registered password Abcd1 as depicted in FIG. 4C. For example, the property of each letter from the third sub-set of letters is compared with the property of the third letter 'c' in the password. In this case, the third sub-set of letters are 2, c, f, and K, which are compared with the third letter 'c' in the actual password. The property (e.g., font style, size, and/or dimension) of 'c' from the third sub-set of letter matches the property (e.g., font style, size, and/or dimension) of first letter 'c' in the password as depicted in FIG. 4C. The authentication system 104 then identifies the third intended letter as 'c' based on the property match, as the property of remaining letters (e.g., 2, f, and K) does not match the property of the third letter 'c' in the actual password.

Figure 4D:
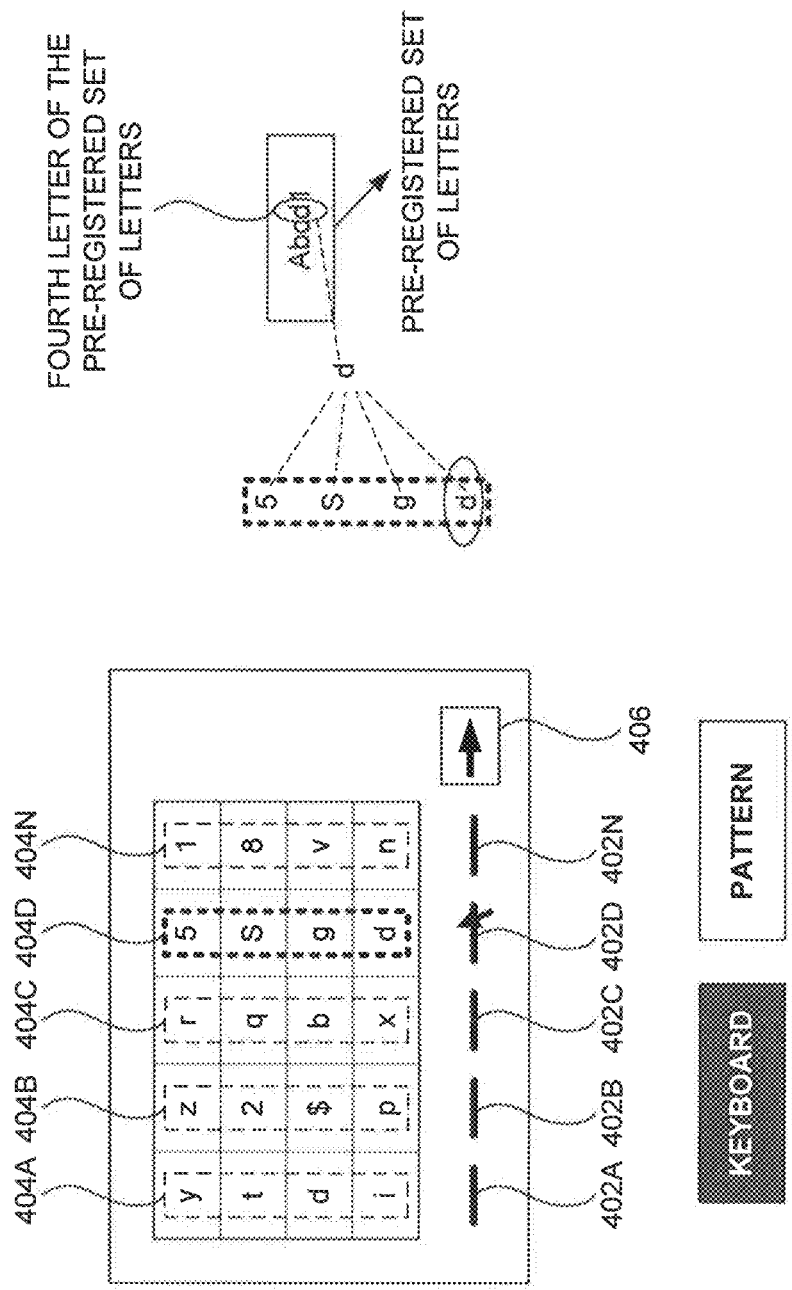

Further, when an input is received on the fourth input receiving identifier 402D, that column (e.g., the fourth column 404D) is identified by the authentication system 104. The authentication system 104 identifies a fourth sub-set of letters and performs comparison of the fourth sub-set of letters with a fourth letter of the pre-registered password Abcd1 as depicted in FIG. 4D. For example, the property of each letter from the fourth sub-set of letters is compared with the property of the fourth letter 'd' in the password. In this case, the fourth sub-set of letters are 5, S, g, and d, which are compared with the fourth letter 'd' in the actual password. The property (e.g., font style, size, and/or dimension) of the letter 'd' from the fourth sub-set of letter matches the property (e.g., font style, size, and/or dimension) of fourth letter 'd' in the password as depicted in FIG. 4D. The authentication system 104 then identifies the fourth intended letter as 'd' based on the property match, as the property of remaining letters (e.g., 5, S, and g) does not match the property of the fourth letter 'd' in the actual password.

Figure 4E:
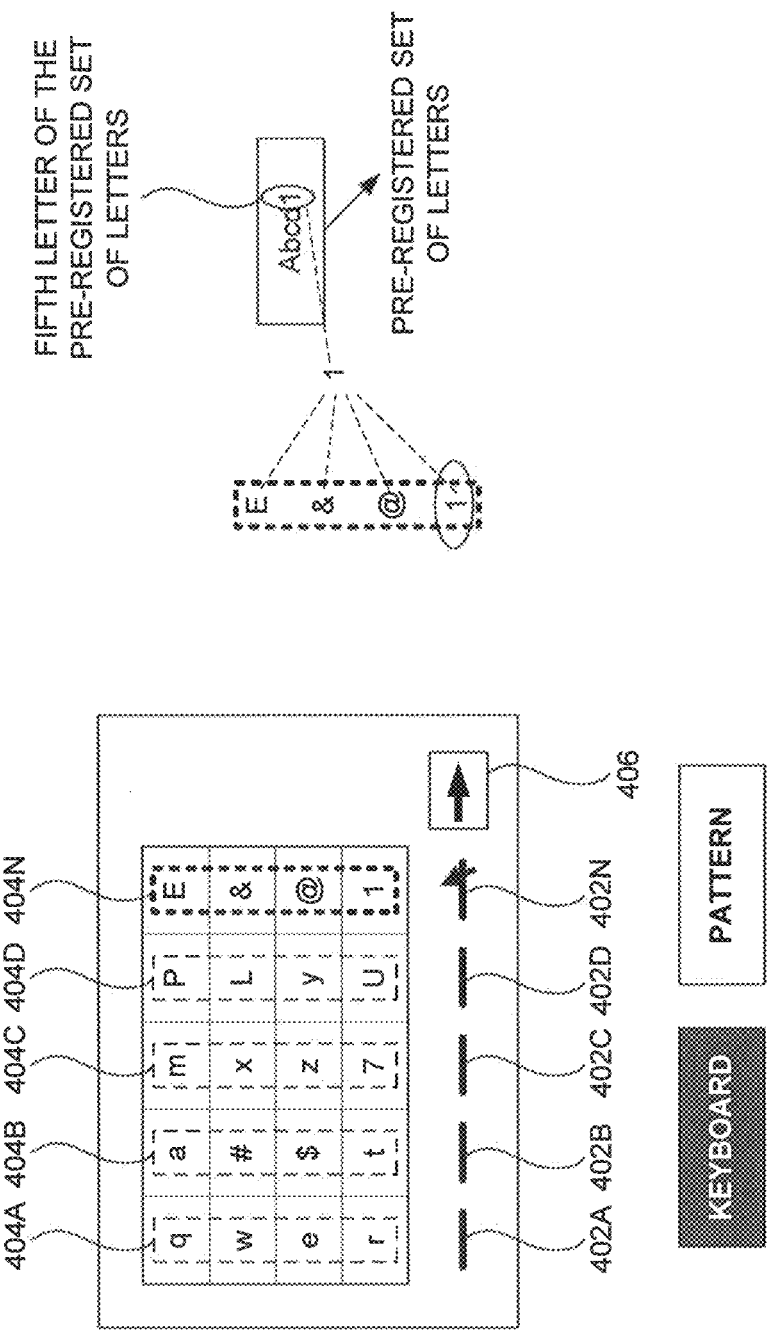

Furthermore, when an input is received on the fifth input receiving identifier 402N, that column (e.g., the fifth column 404N) is identified by the authentication system 104. The authentication system 104 identifies a fifth sub-set of letters and performs comparison of the fifth sub-set of letters with the fifth letter of the pre-registered password Abcd1 as depicted in FIG. 4E. For example, the property of each letter from the fifth sub-set of letters is compared with the property of a fifth letter '1' (numeric one) in the password. In this case, the fifth sub-set of letters are E, &, @, and 1, which are compared with the fifth letter '1' in the actual password. The property (e.g., font style, size, and/or dimension) of '1' from the fifth sub-set of letter matches the property (e.g., font style, size, and/or dimension) of fourth letter '1' in the password in the depicted FIG. 4E. The authentication system 104 then identifies the fifth intended letter as '1' based on the property match, as the property of remaining letters (e.g., E, &, and @) does not match the property of the fifth letter '1' in the actual password.

When the remaining intended letters are to be identified, the letters in the m×n format may be shuffled, and/or at least a sub-set of the letters may or may not be repeated as when compared to the letters present in the m×n matrix format of FIGS. 4A through 4E. The user 102 is authenticated based the matching in a particular sequential order of (i) the pre-registered letters (Abcd1) and the set of intended identified letters (A, b, c, d, and 1). Although the inputs on the set of input receiving identifiers are received in a sequential order, the inputs may also be received in any order, provided, an intended letter is present in a particular row or column. For instance, when 'A' is an identified intended letter, then the next letter 'b' may be present anywhere in the matrix. For example, if 'b' is present in a third column, then an input may be received on the third input receiving identifier 402C, instead of receiving an input on the second input receiving identifier.

Figure 5A:
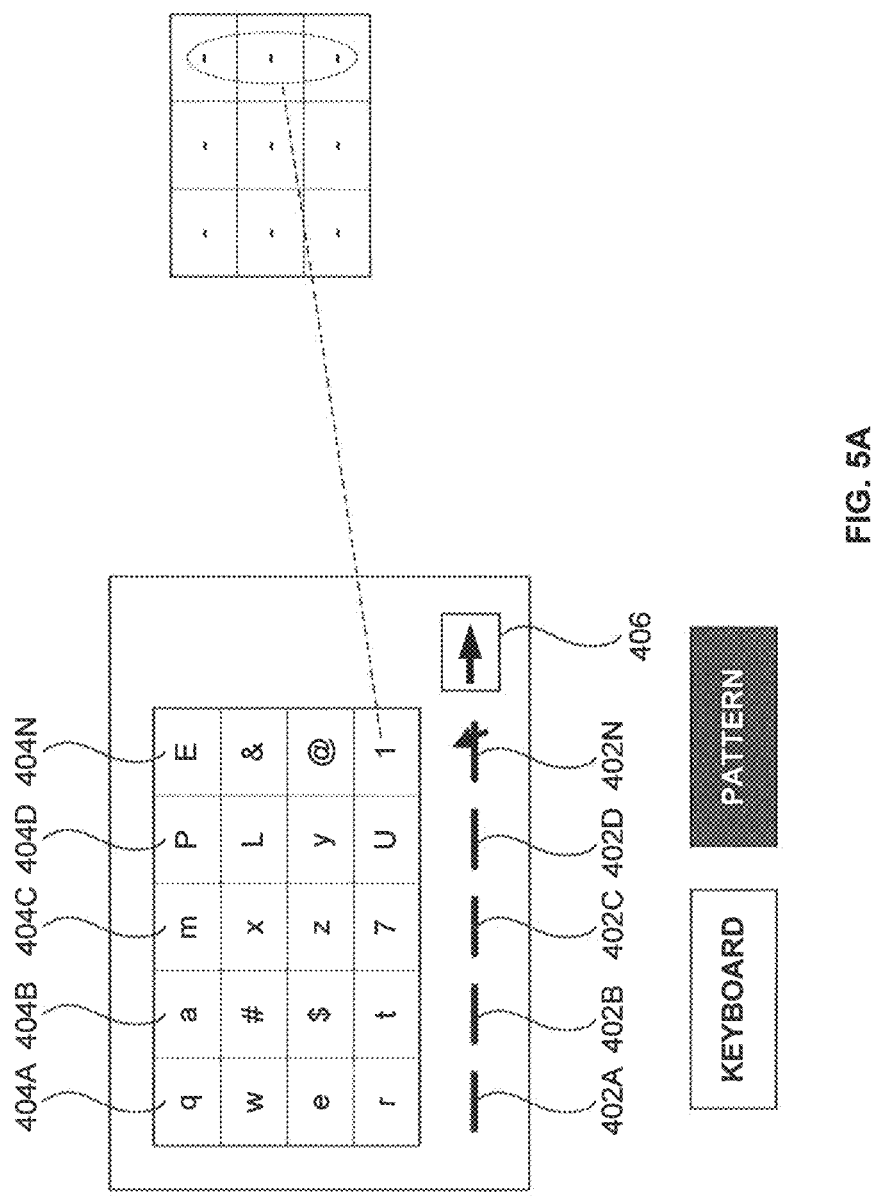
FIG. 5A-5B illustrate an exemplary view of entering letters and/or patterns into a field for authenticating the user of FIG. 1 using the authentication system of FIG. 1 according to an embodiment of the present disclosure.
Figure 5B:
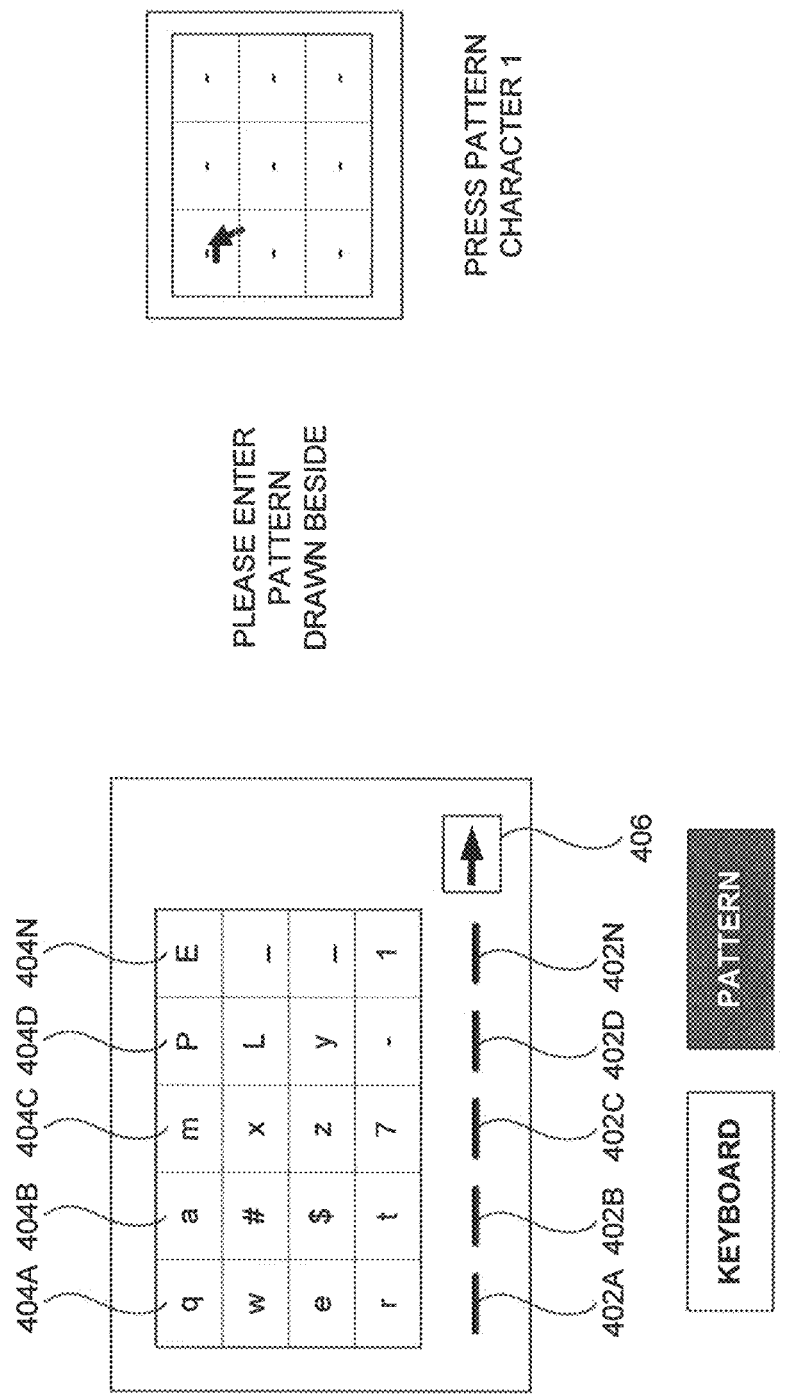

FIG. 5A-5B, with reference to, FIGS. 1 through 4E, illustrate exemplary views of entering letters and/or patterns into a field for authenticating the user 102 using the authentication system 104 according to an embodiment of the present disclosure. As described above, when the pre-registered password comprises a numeral (e.g., 1 in the above FIG. 4A-4E), the alternative approach of identifying the numeral 1 is depicted in FIG. 5A. To populate '1' as an intended letter in the password, the authentication system 104 may follow the steps as indicated in FIG. 4E, or alternative provide a pattern specific to the numeral 1. For example, the pattern shall be visible to the user 102 similar to the way numeral 1 appears. The authentication system 104 may receive one or more inputs on one or more pattern identifiers to complete the pattern. As depicted in FIG. 5A, to enter '1', the user 102 may place the cursor in the manner mentioned in the FIG. 5A (right side pattern with an eclipse representation which is indicative of numeric one (1) by identifying the sequential order of the pattern identifiers from top to bottom).

Similarly, the authentication system 104 implements the steps described above for an entry of captcha (which may be part of the process for authenticating the user 102) as depicted in FIG. 5B. The keyboard dialogue box is activated when one or more inputs are received for letters as depicted in FIGS. 4A-4E. Similarly, the pattern dialogue box is activated when one or more inputs are received for entry of pattern/captcha/characters. The entry of characters involves one or more steps to be followed by the user 102 based on instructions displayed on the display unit. Such instructions comprise, but are not limited to, please enter pattern drawn beside, and press pattern character 1. Based on the instructions, the inputs are received, for example, an input (arrow symbol on pattern character 1) as depicted in FIG. 5B. Although, the FIGS. 3A through 5E depict a 4×4 matrix format and 4×5 matrix format, the authentication system 104 may provide the set of letters and corresponding set of input receiving identifiers, and set of input pattern identifiers in any format that is easily understood by the user 102. Other formats that may be provided could be based on what type of format that has been already displayed at the time of credentials generation (e.g., during the creation of username or password). The user 102 is authenticated based the matching in a particular sequential order of (i) the pre-registered letters (Abcd1) and the set of intended identified letters (A, followed by b, followed by c, followed by d, and followed by 1) and (ii) the intended path and the pattern (or captcha) displayed on the display unit.

Figure 6:
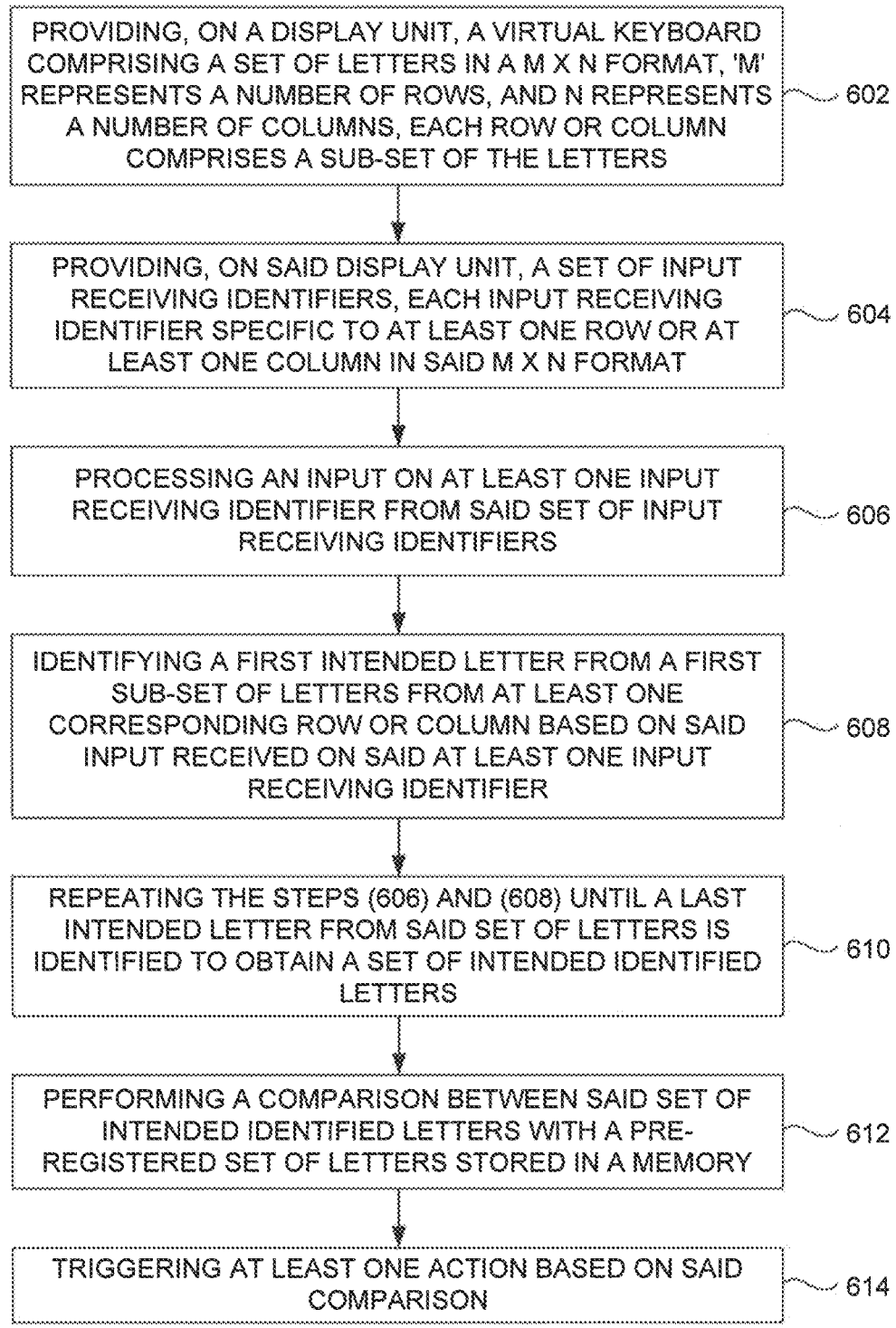
FIG. 6 is a flow diagram illustrating a processor implemented method of authenticating the user of FIG. 1 using the authentication system of FIG. 1 according to an embodiment of the present disclosure.

FIG. 6, with reference to FIGS. 1 through 5, is a flow diagram illustrating a processor implemented method of authenticating the user 102 using the authentication system 104 of FIG. 1 according to an embodiment of the present disclosure. In step 602, a virtual keyboard comprising a set of letters in a m×n format is provided on the display unit. The set of letters are selected from one or more languages. Each row or column is the m×n matrix format comprises a sub-set of the letters. The set of letters comprises at least one of a character, a numeric, a symbol, and so on. The character is at least one of an upper case, or a lower case. In step 604, a set of input receiving identifiers are provided on the display unit. Each input receiving identifier is specific to at least one row or at least one column in the m×n matrix format as depicted in FIGS. 4A-4E.

In step 606, an input is processed (or received) on at least one input receiving identifier from the set of input receiving identifiers. The at least one row or a column from the number of rows and the number of columns is identified based on the input received on the input receiving identifier, and it is further determined whether the first intended letter is present in the first sub-set of letters. In step 608, a first intended letter from a first sub-set of letters from at least one corresponding row or column is identified based on the input received on the at least one input receiving identifier. A property of each letter from the first sub-set of letters is compared with a corresponding letter in the pre-registered letters, and a letter is identified as the first intended letter from the first sub-set of letters from at least one corresponding row or column when the letter matches a corresponding letter from the pre-registered letters.

The steps 606 and 608 are repeated until a last intended letter from the set of letters is identified to obtain a set of intended identified letters. In step 610, a comparison is performed between the set of intended identified letters with a pre-registered set of letters stored in the memory 202. In step 612, at least one action is triggered based on the comparison. The at least one action comprises authenticating a user when each letter in the set of intended identified letters matches a corresponding letter in the pre-registered set of letters.

A pattern may be provided on the display unit, where the pattern includes one or more pattern identifiers. An input is processed on a corresponding pattern identifier from the one or more pattern identifiers to identify an intended pattern identifier from the one or more pattern identifiers in the pattern based on the input. The above step of processing the input to identify a last intended pattern identifier from the one or more pattern identifiers is repeated to obtain an intended path taken to complete the pattern. The one or more pattern identifiers in the pattern each time a pattern identifier is identified. The method further comprises performing another comparison of (i) the set of intended identified letters and the intended path taken to complete the pattern with (ii) the pre-registered set of letters and the pattern displayed on the display unit, and triggering at least one another action based on the another comparison. The another action, for example, includes authenticating a user when (i) each letter in the set of intended identified letters matches a corresponding letter in the pre-registered set of letters stored in the memory, and (ii) the path taken matches the pattern.

The embodiments of the present disclosure provide the authentication system 104 that generates a multidimensional, multi lingual and shuffling keyboard. The authentication system 104 dynamically provides a matrix (or a m×n matrix format) of alpha-numeric and special characters, where the size of the matrix depends on the language, thereby resulting in prevention of shoulder surfing and key logging attacks which in turn will provide a higher grade of security. The authentication system 104 is configured to create a pattern which incorporates the captcha concept into the password (where the password may be encrypted). Unlike conventional keyboards and system, the authentication system 104 provides the matrix with letters in one or more languages, and a set of input receiving identifiers to obtain a set of identified intended letters for authenticating the user 102 by automatically identifying the set of intended letters from one or more sub-set of letters. Further unlike conventional systems where shuffling is limited to one language only, the authentication system 104 further shuffles letters in the matrix at each stage in one or more languages, for example, each time when an intended letter/or intended pattern is identified, thereby resulting a foolproof entry of letters/pattern (or captcha).

The embodiments of the present disclosure and the authentication system 104 may be implemented in, for example, but are not limited to, electronic devices or appliances (e.g., television, setup boxes, and so on), computing systems (e.g., mobile communication devices, smart phones, smart watches, smart display devices, personal computers (PC), laptops, palmtops, tablet PCs, servers, and so on), doors and safety lockers in financial institutions, private and government organizations, schools, colleges, universities, shops (e.g., retail outlet, jewelry stores and so on), residences (e.g., safety lockers, treasury, doors), telephone booths, vending machines/apparatuses, dispensing apparatuses, website(s)/webpage(s) login or authentication, and other locations/devices where a user is required to login (or feed security codes) into a system for authentication and authorization to access information (any data or any material that is treated as confidential, internal, restricted, private, personal, and so on).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method comprising:
   (a) dynamically providing a keyboard on a display unit connected to a hardware keyboard comprising a set of letters in a m×n format, wherein 'm' represents a number of rows, and 'n' represents a number of columns, wherein each row or column comprises a sub-set of said letters, wherein the hardware keyboard include buttons that are aligned in parallel with the set of letters in said m×n format provided in said display unit and the hardware keyboard is connected to a system and a hardware processor provides a set of input receiving identifiers on said display unit;
   (b) providing the set of input receiving identifiers, each input receiving identifier specific to at least one row or at least one column in said m×n format;
   (c) processing an input received on at least one input receiving identifier from said set of input receiving identifiers, wherein the input is received on at least one input receiving identifier within a time interval, wherein the time interval varies for each input received on at least one input receiving identifier, and wherein a user is prompted with an alert message to provide a correct input within a time interval, in response to an incorrect input received on the at least one input receiving identifier, based on previous history of the user in inputting letters in the keyboard, learning age, gender, and geography of the user while making the incorrect password entry, and learning a pattern in which the user is making the incorrect input;

(d) identifying a first intended letter from a first sub-set of letters from at least one corresponding row or column based on said input received on said at least one input receiving identifier;

(e) repeating the steps (c) and (d) until a last intended letter from a last sub-set of said set of letters is identified to obtain a set of intended identified letters, wherein the input received on the input receiving identifiers is in a non-sequential order such that one of the first intended letter, and the last intended letter is present in the corresponding row or column;

(f) performing a comparison between said set of intended identified letters with a pre-registered set of letters stored in a memory; and (g) triggering at least one action based on said comparison.

2. The processor implemented method of claim 1, wherein said identifying said first intended letter from said first sub-set of letters comprises:

(h) identifying at least one row or a column from said number of rows and said number of columns based on said input on said input receiving identifier; and (i) determining whether said first intended letter is present in said first sub-set of letters.

3. The processor implemented method of claim 2, wherein said identifying at least one row or a column from said number of rows and said number of columns comprises:

(j) comparing a property of each letter from said first sub-set of letters in said at least one row or said column with a corresponding letter in said pre-registered set of letters, wherein said property comprises at least one of a letter style, a letter size and a dimension, wherein the dimension of each letter from said first sub-set of letters in said at least one row or said column is compared with the dimension of the corresponding letter in said pre-registered set of letters; and (k) identifying a letter as said first intended letter from said first sub-set of letters from at least one corresponding row or column when said letter matches a corresponding letter from said pre-registered letters.

4. The processor implemented method of claim 1, wherein said set of letters are selected from one or more languages.

5. The processor implemented method of claim 4, further comprising: (l) shuffling said set of letters in said m×n format each time an intended letter is identified and further display said set of letters in more than one language.

6. The processor implemented method of claim 1, wherein said set of letters comprises at least one of a character, a numeric, and a symbol.

7. The processor implemented method of claim 6, wherein said character is at least one of an upper case, or a lower case.

8. The processor implemented method of claim 1, wherein said triggering said at least one action based on said comparison comprises authenticating the user when each letter in said set of intended identified letters matches a corresponding letter in said pre-registered set of letters.

9. The processor implemented method of claim 1, further comprising:

(m) providing a pattern on the display unit, said pattern comprising one or more pattern identifiers;

(n) processing an input on a corresponding pattern identifier from said one or more pattern identifiers;

(o) identifying an intended pattern identifier from said one or more pattern identifiers in said pattern based on said input;

(p) repeating the steps (n) and (o) until a last intended pattern identifier from said one or more pattern identifiers is identified to obtain an intended path taken to complete said pattern;

(q) performing another comparison of said set of intended identified letters and said intended path taken to complete said pattern with said pre-registered set of letters and said pattern on said display unit; and (r) triggering at least one another action based on said another comparison.

10. The processor implemented method of claim 9, wherein said triggering said at least one another action based on said another comparison comprises authenticating the user when (i) each letter in said set of intended identified letters matches a corresponding letter in said pre-registered set of letters stored in said memory, and (ii) said intended path matches said pattern.

11. A system comprising:

a memory storing instructions and a pre-registered set of letters; and a hardware processor coupled to said memory, wherein said hardware processor is configured by said instructions to:

(a) dynamically provide a keyboard on a display unit connected to a hardware keyboard comprising a set of letters in a m×n format, wherein 'm' represents a number of rows, and 'n' represents a number of columns, wherein each row or column comprises a sub-set of said letters, wherein the hardware keyboard include buttons that are aligned in parallel with the set of letters in said m×n format provided in said display unit and the hardware keyboard is connected to the system and the hardware processor provides a set of input receiving identifiers on said display unit, (b) provide the set of input receiving identifiers, each input receiving identifier specific to at least one row or at least one column in said m×n format, (c) process an input received on at least one input receiving identifier from said set of input receiving identifiers, wherein the input is received on at least one input receiving identifier within a time interval, wherein the time interval varies for each input received on at least one input receiving identifier, and wherein a user is prompted to provide a correct input within a time interval, in response to an incorrect input received on the at least one input receiving identifier, based on previous history of the user in inputting letters in the keyboard, learning age, gender, and geography of the user while making the incorrect password entry, and learning a pattern in which the user is making the incorrect input, (d) identify a first intended letter from a first sub-set of letters from at least one corresponding row or column based on said input received on said at least one input receiving identifier, (e) repeat the steps (c) and (d) until a last intended letter from a last sub-set of letters in said set of letters is identified to obtain a set of intended identified letters, wherein the input received on the input receiving identifiers is in a non-sequential order such that one of the first intended letter, and the last intended letter is present in the corresponding row or column, (f) perform a comparison between said set of intended identified letters with said pre-registered set of letters stored in said memory, and (g) trigger at least one action based on said comparison.

12. The system of claim 11, wherein said hardware processor is further configured to:

(h) identify at least one row or a column from said number of rows and said number of columns based on said input received on said input receiving identifier, and (i) determine whether said first intended letter is present in said first sub-set of letters.

13. The system of claim 12, wherein said hardware processor is further configured by said instructions to:

(j) compare a property of each letter from said first sub-set of letters with a corresponding letter in said pre-registered letters, wherein said property comprises at least one of a letter style, a letter size and a dimension, wherein the dimension of each letter from said first sub-set of letters in said at least one row or said column is compared with the dimension of the corresponding letter in said pre-registered set of letters, and (k) identify a letter as said first intended letter from said first sub-set of letters from at least one corresponding row or column when said letter matches a corresponding letter from said pre-registered letters.

14. The system of claim 11, wherein said set of letters are selected from one or more languages.

15. The system of claim 14, wherein said hardware processor is further configured by said instructions to (l) shuffle said set of letters in said m×n format each time an intended letter is identified and further display said set of letters in more than one language.

16. The system of claim 11, wherein said set of letters comprises at least one of a character, a numeric, and a symbol, and wherein said character is at least one of an upper case or a lower case.

17. The system of claim 11, wherein hardware processor is further configured by said instructions to authenticate the user based on said at least one action when each letter in said set of intended identified letters matches a corresponding letter in said pre-registered set of letters.

18. The system of claim 11, wherein said hardware processor is further configured by said instructions to:

(m) provide a pattern on the display unit, said pattern comprising one or more pattern identifiers, (n) process an input on a corresponding pattern identifier from said one or more pattern identifiers, (o) identify an intended pattern identifier from said one or more pattern identifiers in said pattern based on said input, (p) repeat the steps (n) and (o) until a last intended pattern identifier from said one or more pattern identifiers is identified to obtain an intended path taken to complete said pattern, (q) perform another comparison of said set of intended identified letters and said intended path taken to complete said pattern with said pre-registered set of letters and said pattern on said display unit, and (r) trigger at least one another action based on said another comparison.

19. The system of claim 18, wherein said hardware processor is further configured by said instructions to authenticate the user when (i) each letter in said set of intended identified letters matches a corresponding letter in said pre-registered set of letters stored in said memory, and (ii) said intended path matches said pattern.

20. One or more non-transitory machine readable information storage mediums comprising one or more instructions, which when executed by one or more hardware processors causes to perform a computer implemented method comprising:

(a) dynamically providing a keyboard on a display unit connected to a hardware keyboard comprising a set of letters in a m×n format, wherein 'm' represents a number of rows, and 'n' represents a number of columns, wherein each row or column comprises a sub-set of said letters, wherein the hardware keyboard include buttons that are aligned in parallel with the set of letters in said m×n format provided in said display unit and the hardware keyboard is connected to a system and a hardware processor provides a set of input receiving identifiers on said display unit;

(b) providing the set of input receiving identifiers, each input receiving identifier specific to at least one row or at least one column in said m×n format;

(c) processing an input received on at least one input receiving identifier from said set of input receiving identifiers, wherein the input is received on at least one input receiving identifier within a time interval, wherein the time interval varies for each input received on at least one input receiving identifier, and wherein a user is prompted to provide a correct input within a time interval, in response to an incorrect input received on the at least one input receiving identifier, based on previous history of the user in inputting letters in the keyboard, learning age, gender, and geography of the user while making the incorrect password entry, and learning a pattern in which the user is making the incorrect input;

(d) identifying a first intended letter from a first sub-set of letters from at least one corresponding row or column based on said input received on said at least one input receiving identifier;

(e) repeating the steps (c) and (d) until a last intended letter from a last sub-set of said set of letters is identified to obtain a set of intended identified letters, wherein the input received on the input receiving identifiers is in a non-sequential order such that one of the first intended letter, and the last intended letter is present in the corresponding row or column;

(f) performing a comparison between said set of intended identified letters with a pre-registered set of letters stored in a memory; and (g) triggering at least one action based on said comparison.

21. The one or more non-transitory machine readable information storage mediums of claim 20, said method further comprising:

(h) providing a pattern on the display unit, said pattern comprising one or more pattern identifiers;

(i) processing an input on a corresponding pattern identifier from said one or more pattern identifiers;

(j) identifying an intended pattern identifier from said one or more pattern identifiers in said pattern based on said input;

(k) repeating the steps (h) and (j) until a last intended pattern identifier from said one or more pattern identifiers is identified to obtain an intended path taken to complete said pattern;

(l) performing another comparison of said set of intended identified letters and said intended path taken to complete said pattern with said pre-registered set of letters and said pattern on said display unit; and (m) triggering at least one another action based on said another comparison.

\* \* \* \* \*